United States Patent [19]
Fowler

[11] Patent Number: 4,671,120
[45] Date of Patent: Jun. 9, 1987

[54] COMBINED HEADING AND DEPTH SENSOR

[75] Inventor: John T. Fowler, Marblehead, Mass.

[73] Assignee: The Laitram Corporation, New Orleans, La.

[21] Appl. No.: 488,139

[22] Filed: Apr. 25, 1983

[51] Int. Cl.[4] .................. G01F 23/00; G01C 17/00
[52] U.S. Cl. ..................................... 73/291; 33/354; 367/19
[58] Field of Search ............... 33/354, 361; 73/291, 73/170 R, 170 A; 114/244, 245, 21 A, 25; 367/18, 19, 20; 181/110, 141; 340/310 A, 852; 102/412, 414

[56] References Cited

U.S. PATENT DOCUMENTS

| | | | |
|---|---|---|---|
| 2,671,275 | 3/1954 | Burns, Jr. | 33/361 |
| 3,355,949 | 12/1967 | Elwood et al. | 73/170 R |
| 3,371,739 | 3/1968 | Pearson | 367/18 |
| 3,727,177 | 4/1973 | Fuller et al. | 33/361 |
| 3,807,341 | 4/1974 | Miller | 114/245 |
| 4,027,398 | 6/1977 | Fowler et al. | 33/363 K |
| 4,139,737 | 2/1979 | Shimada et al. | 340/310 A |
| 4,258,568 | 3/1981 | Boetes et al. | 73/170 A |
| 4,290,123 | 9/1981 | Pickens | 73/1 DV |
| 4,376,301 | 3/1983 | Roberts | 367/19 |
| 4,418,480 | 12/1983 | Garner | 33/361 |
| 4,477,887 | 10/1984 | Berni | 367/20 |
| 4,479,183 | 10/1984 | Ercas | 367/20 |
| 4,481,611 | 11/1984 | Burrage | 367/19 |
| 4,523,191 | 6/1985 | Cretin et al. | 367/20 |
| 4,528,650 | 6/1985 | Howlett et al. | 340/870.13 |

Primary Examiner—Charles Frankfort
Assistant Examiner—Thomas B. Will
Attorney, Agent, or Firm—Weingarten, Schurgin, Gagnebin & Hayes

[57] ABSTRACT

A combined heading and depth sensor for acquisition of both compass heading and depth data and transmission of the combined data over a two wire communication link as a single packet of information to a remote data acquisition unit. The sensor includes a remote reading compass assembly, a depth sensor and circuitry to interface the compass and depth sensors to the communication link. A communication protocol is defined permitting addressable interrogation of a plurality of combined heading and depth sensors over the two wire link.

10 Claims, 9 Drawing Figures

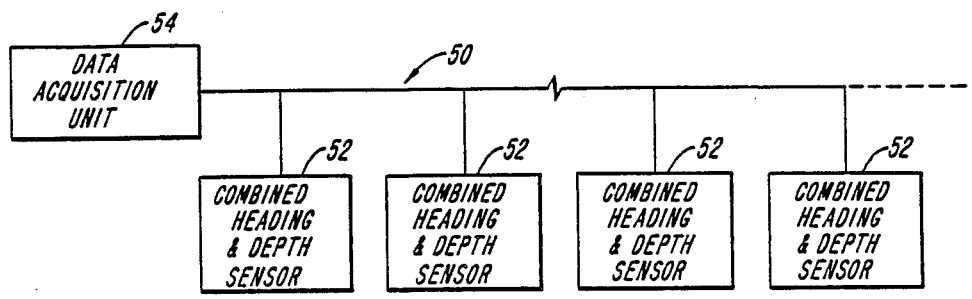
FIG. 1
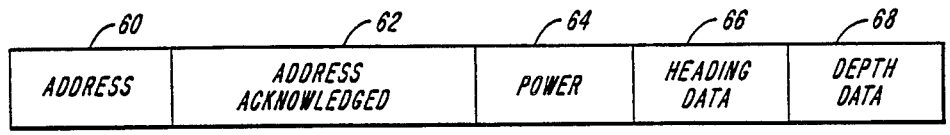
FIG. 5
| SIGNAL | DIRECTION | |
| --- | --- | --- |
| | FROM | TO |
| ADDRESS | DATA ACQUISITION UNIT | HEADING & DEPTH UNIT |
| ADDRESS ACKNOWLEDGEMENT | HEADING & DEPTH SENSOR | DATA ACQUISITION UNIT |
| POWER | DATA ACQUISITION UNIT | HEADING & DEPTH SENSOR |
| COMPASS HEADING DATA | HEADING & DEPTH SENSOR | DATA ACQUISITION UNIT |
| DEPTH DATA | HEADING & DEPTH SENSOR | DATA ACQUISITION UNIT |
FIG. 6

COMBINED HEADING AND DEPTH SENSOR

FIELD OF THE INVENTION

This invention relates to data acquisition systems and more specifically to a combined heading and depth sensor for submersible application and a method for efficiently transmitting data from the heading and depth sensor over a communication link to a remote acquisition unit.

BACKGROUND OF THE INVENTION

In marine exploration, seismic and various underwater applications, it is often necessary to measure, record and transmit to remote locations sampled readings of water depth and compass heading over a period of time. Acquisition of data representative of direction and depth has been achieved through the use of remote sensors which provide electrical signals responsive to magnetic compass heading and depth. In prior art systems, data representative of either compass heading or depth is transmitted to remote data acquisition units over a multiwire communication link. The communication link is typically disposed within a streamer, a cable normally employed to transmit between 64 and 1000 channels of hydrophone data to a remote data acquisition unit. The streamer is typically towed behind a vessel, thereby providing data from sensors at a number of sensor positions along the streamer.

It is well known in the art to sense compass heading using a submersible sensor. A patent on a remote reading compass has been granted to this applicant and assigned to the same assignee as the present application. Communication of data from remote transducers via a single two wire conductor has also been previously described in U.S. Pat. No. 4,093,946 of the same assignee.

In a typical seismic streamer or towed sonar array, a plurality of sensors, usually hydrophones, are connected to the streamer. In previous systems, sensors have been individually housed with separate sensor electronics permitting unique address selection and activation of the sensor responsive to address codes transmitted over the communication link by a data acquisition unit. Upon address recognition and selection of a specific sensor along the streamer, the selected sensor interface circuitry responds over the link with an address acknowledgement and subsequently with data representative of the compass heading or depth of the respective sensor. Acquisition of data from a plurality of sensors requires sequential polled transactions over the communications link.

Several limitations result from the independent housing of compass heading and depth sensors as suggested by the prior art. One limitation obtains from the requirement that each sensor be uniquely addressed or polled over the link. A typical data transmission period including address transmission address acknowlegement and data response intervals in total may occupy 40 milliseconds. Thus, the system is bandwidth limited to the inverse of the data transmission period, to approximately 25 samples per second. It is therefore apparent that repetition of the address interrogation sequence when addressing a plurality of sensors limits the achievable system data sampling rate. Moreover, housing compass heading and depth sensors separately results in cost penalties due to replication of the housing and sensor interface circuitry.

SUMMARY OF THE INVENTION

Briefly, the present invention discloses a sensor for the acquisition for both compass heading and depth data and describes a technique for more efficient data transmission of compass heading and depth data over a submersible communication link to a remote data acquisition unit. A compass heading sensor, a depth sensor and interface circuitry are integrated within a house intended for submersible application. The remote data acquisition unit, typically located aboard a vessel, transmits a binary coded address over the communication link for receipt by a plurality of combined compass heading and depth sensors connected to the link, each capable of unique address recognition. Upon address recognition and selection of one of the sensors, an address acknowledgement signal is transmitted to the data acquisition unit from the combined heading and depth sensor indicating address receipt and activation of the particular unit. In one embodiment the data acquisition unit thereupon provides power over the communication link for activation of compass heading sensor electronics. Output data from the compass heading sensor and the depth sensor are latched and sequentially applied to the communication link by the interface circuitry in a bit serial format.

Another protocol is disclosed in which a Direct Current (D.C.) voltage is applied to the link by the data acquisition unit to power the combined heading and depth sensors. The data acquisition unit transmits a binary coded address over the link by superimposing the data on the D.C. voltage. Upon address recognition and sensor selection, the selected sensor responds with an address acknowledgement by superimposing the acknowledgement on the D.C. voltage in this embodiment. Alternatively the protocol does not include an address acknowledgement. The selected sensor subsequently transmits data representative of the compass heading and depth of the sensor to the data acquisition unit by superimposing the data on the D.C. voltage in a bit serial format.

The combined heading and depth sensor as described provides improved performance and reduced cost in comparison to sensors disclosed in the prior art. The transmission of both heading and depth data over the communication link in response to a single address transmission over the link reduces the link time utilization associated with the sequential address selection and acknowledgement of multiple sensors thereby increasing the overall sensor sampling rate.

The combination of the compass heading sensor and the depth sensor within a common housing eliminates the cost penalty due to the duplication of housings for individual compass heading and depth sensors, and further, permits the sensors to share the same damping fluid, isolation bladder and interface circuitry.

DESCRIPTION OF THE DRAWINGS

The invention will be more fully understood from the following detailed description taken in conjunction with the accompanying drawings, in which:

FIG. 1 is a block diagram of a data acquisition system utilizing combined heading and depth sensors of the present invention;

FIG. 5 illustrates a protocol for communication along the link or communication link;

FIG. 6 is a table identifying signal and data transmission direction on the communication link or streamer;

DETAILED DESCRIPTION OF THE INVENTION

FIG. 1 illustrates a block diagram of a system for acquisition of compass heading and depth data via a combined compass heading and depth sensor and for transmission of the data over a communication link to a remote data acquisition unit. Utilization of such systems is common in seismic and oceanographic exploration. Typically a data acquisition unit is located aboard a vessel and a streamer is towed behind. A plurality of transducers are submersibly disposed along the streamer at various distances from the vessel. The communication link employed in the present invention may be incorporated within a typical streamer or may be a separate two wire cable. The transducers contain electronic circuitry which permits communication of heading and depth data to the remote data acquisition unit by the sensor over the communication link upon inquiry by the data acquistion unit. System operation is more clearly seen by reference to FIG. 1.

A data acquisition unit 10 is typically located at one end of a communication link 12. A plurality of combined heading and depth sensors 14 are mounted along the link 12 and interface via an electrical two wire connection to the link 12. The data acquistion unit 10 initiates a data inquiry sequence by transmitting a signal over the communication link 12 for receipt by all sensors 14. The signal transmitted over the link 12 is a serial binary coded address which uniquely identifies one of the plurality of sensors 14 disposed along the link 12. The combined heading and depth sensors 14 receive all addresses transmitted across the link 12, however only one sensor is activated for data response upon comparison of the transmitted address with its unique identifying address code. In response to the transmitted address comparison and selection of one of the combined heading and depth sensors 14, the selected sensor generates an address acknowledgement signal and transmits the signal representative of address recognition over the link 12 for receipt by the data acquisition unit 10 in one embodiment. In another embodiment of the invention no address acknowledgement is provided. Further responsive to sensor selection, one of the combined sensors 14 samples individual compass heading and depth transducers and transmits binary coded signals representative of heading and depth data to the data acquisition unit 10 via the two wire communication link 12 for recording and or processing.

Sensors 14 are sequentially polled with the polling sequence under the control of the data acquisition unit 10. The link protocol requires completion of the data transmission sequence over the link 12 by each selected sensor 14 prior to transmission of a new address code over the link 12 by the data acquisition unit 10 to prevent contention for the link 12 and consequent loss of data.

Figure 2:
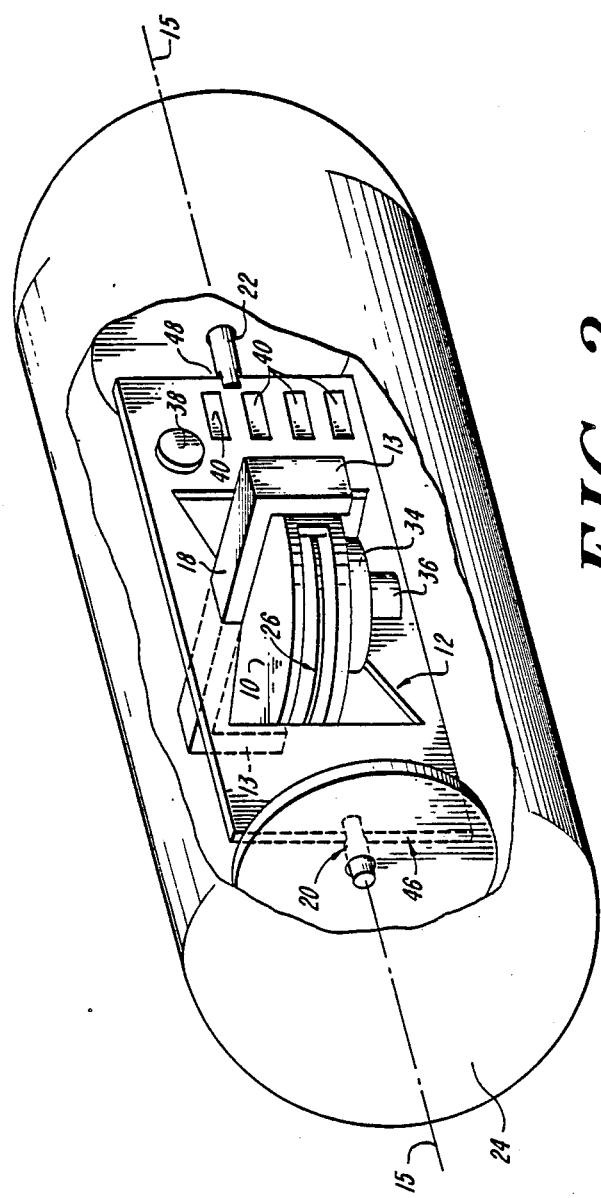
FIG. 2 is a perspective view of the combined sensor illustrating the mounting of the compass heading sensor and the depth sensor within the outer housing.
Figure 3:
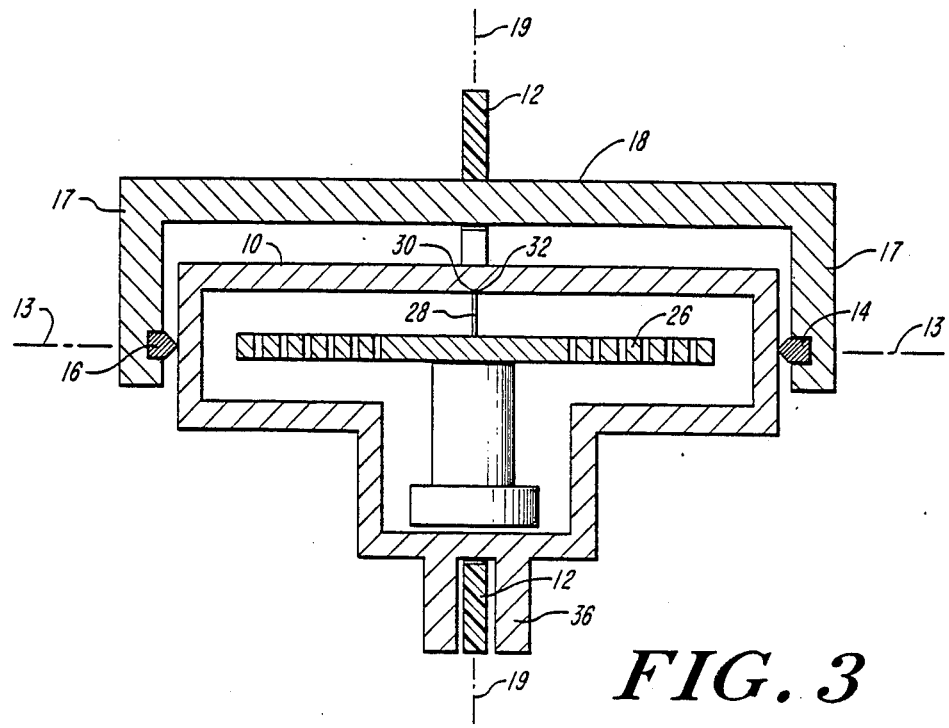
FIG. 3 is a cross-sectional elevation view of the combined sensor of FIG. 2.
Figure 4:
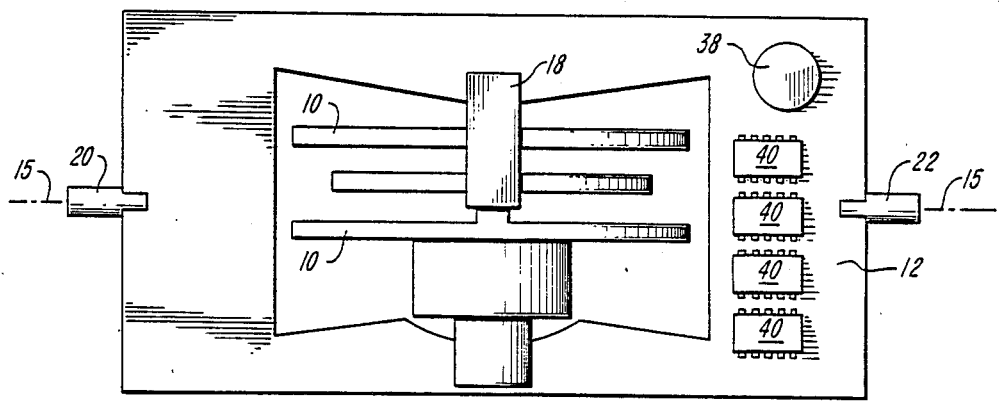
FIG. 4 is an elevation view of the combined sensor of FIG. 2.

The operation of the compass heading and depth transducers and one embodiment of the combined heading and depth sensor is further illustrated by reference to FIGS. 2, 3, and 4 illustrating the use of a single pivot magnetic compass as the heading transducer. It should be noted that the single pivot compass heading transducer illustrated is the subject of U.S. Pat. No. 4,027,398 of the same assignee as the present invention. The combined sensor is enclosed within a waterproof housing 16 containing a liquid. Within the outer housing 16, an apertured printed circuit board 18 is adapted for rotatable mounting about a roll axis 20 via pivots 22 and 24 located on opposing printed circuit board edges 26 and 28 respectively. A yoke 30 haing normally downwardly extending mounting arms is transversely mounted to the apertured printed circuit board 18 and adapted to receive a compass assembly symmetrically within the aperture of the printed circuit board 18. The compass assembly includes a compass support structure 32 which is pivotably mounted between the downwardly extending mounting arms of the yoke 30 to permit rotation of the assembly about a pitch axis 34 around opposing pivot pins 36 and 38. An optically encoded disc 40 is pivotably disposed within the compass supported structure 32 to allow rotation of the disc 40 about a normally vertical axis 41. An upward buoyant force is exerted upon the optically encoded disc 40 which is pivotably coupled to and spaced from the compass support structure 32 via a pivot pin 42. The pivot pin 42 engages a pivot cup 44 in the structure 32. The upward buoyant force maintains the disc 40 and pin 42 in pivotable coupled relationship with the structure 32. Pivotable freedom of the printed circuit board 18 about the roll axis 20 in conjunction with the pivotable freedom of the compass assembly about the pitch axis 34 provides gimballed mounting for the compass support structure 32 and maintenance of a normally horizontal orientation of the compass assembly due to the split counterweight 46 which established a center of gravity for the compass support structure 32 below the poll and pitch rotational axes. In one embodiment, split counterweight 46 is integrated with the compass support structure 32 and rides in a non-contacting relationship on either side of the printed circuit board 18. Not shown is the optically encoded disc photosensing system including light emitting and light sensitive elements necessary for decoding the optically encoded disc which is described with particularity in U.S. Pat. No. 4,027,398.

Figure 7:
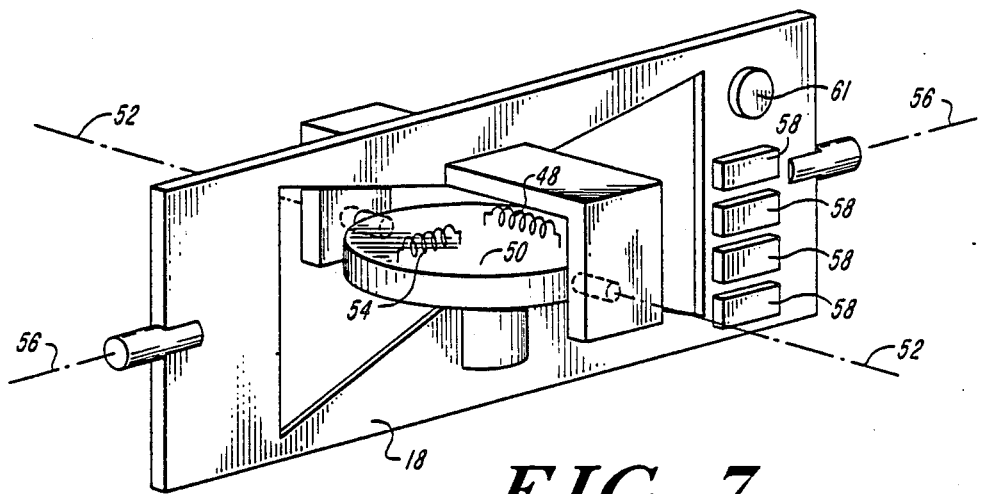
FIG. 7 is a perspective view of an X-Y axis resolver magnetometer employed as the compass heading sensor in one embodiment of the invention.

In another embodiment of the invention an X-Y axis resolver magnetometer, illustrated in FIG. 7, is substituted for the single pivot compass assembly. The magnetometer includes a first coil 48 disposed on a normally horizontal support platform 50 along a first axis and a second coil 54 disposed on the platform 50 along a second axis perpendicular to the first axis. The support platform 50 is fully gimballed and supported for pivotal rotation about a pitch axis 52 and a roll axis 56. The exertion of magnetic compass forces upon the first coil 48 and the second coil 54 produces changes in first and second signals through the first coil 48 and the second coil 54 which are processed and resolved by electrical circuitry 58 disposed on the printed circuit board 18 to provide an output signal representative of compass heading. The output signal is transmitted to the data acquisition unit 10 along the link 12 by one of the sensors 14 in accordance with one of the protocols illustrated in FIGS. 5, 8, or 9. It is noted that the address acknowledgement signal 66 may be deleted from the protocol illustrated in FIG. 5.

Also depicted in FIGS. 2 and 4 is a depth transducer 60, or a depth transducer 61 as shown in FIG. 7 which produces an electrical signal responsive to water pressure and representative of sensor depth, and electronic circuitry 62, in FIGS. 2 and 4, or circuitry 58 in FIG. 7 which provides for communication link address recognition and additionally provides a data response facility. The depth transducer is preferably a piezoelectric transducer, however, the invention contemplates any transducer which generates a signal proportional to depth and is not limited to piezoelectric transducers. Also required, but not shown, are printed wiring paths defining electrical circuit connections.

Operation of the combined heading and depth sensor shown in FIGS. 2–4 and FIG. 7 will be understood by reference to the communication link protocol depicted in FIG. 5 and the table of FIG. 6 representing signal tranfer direction along the communication link 12. The data acquisition unit 10 transmits an address signal over the link 12 specifically identifying a combined heading and depth sensor 14. The address signal remains on the link for the address signal segment 64 illustrated in FIG. 5. Sensor circuitry 58 or 62 generates a signal responsive to the transmitted address and further generates an address acknowledgement signal which is transmitted to the data acquisition unit 10 over the link 12 during an address acknowledgement signal segment 66. The data acquisition unit 10, in response to the receipt of the address acknowledgement signal transmitted by the combined heading and depth sensor 14 applies power to the communication link during the power segment 68 for activation of the heading sensing electronics in the sensor thereby generating a binary coded indication of compass heading. During heading signal segment 70, a signal representative of the compass heading transducer output is applied to the communication link 12 via the sensor circuitry 58 or 62 in bit serial format for receipt by the data acquisition unit 10. During depth signal segment 72, a signal representative of depth data output from the depth transducer 60 or 61 is applied to the communication link 12 in bit serial format by the sensor circuitry 62 or 58 respectively for receipt by the data acquisition unit 10 thereby completing the time multiplexed data transmission sequence initiated by the data acquisition unit 10. The sequence is typically repeated for acquisition of data from a plurality of combined heading and depth sensors.

Figure 8:
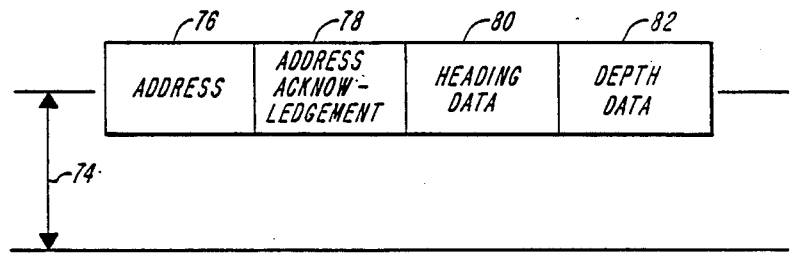
FIG. 8 illustrates a protocol for communication along the link including an address acknowledgement signal wherein address acknowledgement and data signals are superimposed on a D.C. voltage employed to power respective sensors.

In another embodiment of the protocol illustrated in FIG. 8 power for the combined heading and depth sensors 14 is continuously provided over the link 12 by the data acquisition unit 10. Data transmission over the two wire link 12 is accomplished by superimposing data on a D.C. voltage 74 continuously applied to the two wire link 12. The data acquisition unit 10 transmits a binary coded address in a first address signal segment 76 to one of the remote combined heading and depth sensors 14 by superimposing the address data on the D.C. voltage 74. A sensor, upon address recognition and selection, transmits an address acknowledgement in an acknowledgement signal segment 78 to the data acquisition unit 10 over the link 12 by superimposing the acknowlegement on the D.C. voltage 74. The sensor similarly transmits heading data and depth data in a respective heading signal segment 80 and a depth signal segment 82 by modulation of the D.C. voltage 74. It is clear that the order of transmitted heading and depth data is not critical.

Figure 9:
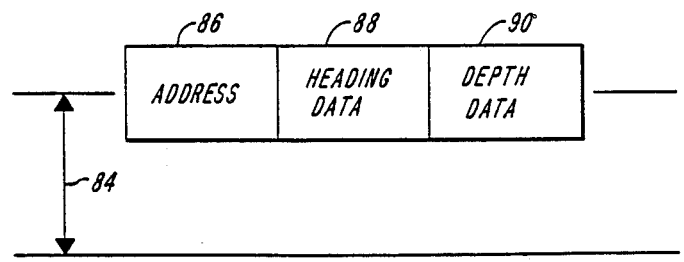
FIG. 9 illustrates the protocol in accordance with FIG. 8 wherein no address acknowledgement is provided.

FIG. 9 shows another communication protocol in which data transmitted over the link 12 is superimposed on a D.C. voltage 84 continuously applied to the link 12 by the data acquisition unit 10. The data acquisition unit 10 transmits a binary coded address signal in an address signal segment 86 over the link 12 by superimposing the data on the D.C. voltage 84. Heading data and depth data are transmitted in a respective heading signal segment 88 and a depth signal segment 90 to the data acquisition unit 10 by the selected one of the sensors 14 by superimposing the binary data on the D.C. voltage 84. It is noted that no address acknowledgement is provided by the selected sensor for the protocol illustrated in FIG. 9.

While only specific embodiments of the combined heading and depth sensor have been illustrated, modifications of, other uses for, and departures from the inventive concepts herein contained shall be apparent given the benefit of the foregoing disclosure. Consequently, this invention is to be construed as embracing each and every novel feature and novel combination of features present in or possessed by the combined sensor and techniques for data transmission herein disclosed and shall be limited only by the scope and spirit of the appended claims.

What is claimed is:

1. A combined remote reading heading and depth sensor comprising:

an outer housing containing a damping liquid;

an apertured printed circuit board with a yoke having mounting arms on either side of said printed circuit board;

first pivot means permitting relative roll rotation of said PC board within said outer housing about a first axis;

an inner compass support structure;

a rotatable compass assembly within said inner compass support structure comprising:

a disc having coded representations of compass heading provided on a surface thereof and buoyant in said damping liquid;

a single pivot bearing coupling said disc to an upper portion of said structure and providing rotation of said disc about a normally vertical axis; and magnet means disposed below said disc and spaced therefrom and affixed to said disc for rotation therewith;

said rotatable assembly being buoyant with respect to said damping liquid and supported by said single pivot bearing at a level in said damping liquid below the normal level of buoyance and having a center of gravity below the center of buoyancy to maintain said compass disc in intended horizontal disposition;

said single pivot bearing being constructed to permit tilting of said structure with respect to a horizontal axis by a selected amount;

means in said structure for photoelectrically sensing the coded representations on said compass disc to provide electrical signals representative of compass heading;

second pivot means permitting relative pitch rotation of the inner compass support structure with respect to the yoke mounting arms about a horizontal axis orthogonal to a plane established by the surface of the PC board, a depth sensor adapted for mounting on said PC board providing an electrical signal representative of depth;

circuit means for transmitting data representative of said compass heading signal and said depth signal to a remote data acquisition unit over a two wire communication link in response to a unique identifying address transmit over the link by the data acquisition unit.

2. A combined remote reading heading and depth sensor according to claim 1 wherein said circuit means transmits an address acknowledgement signal to said data acquisition system over said two wire communication link upon unique identifying address recognition.

3. A combined remote reading heading and depth sensor according to claim 2 wherein said circuit means activates said photoelectric sensing means via power supplied over said communication link by said data acquisition unit.

4. A combined remote readng heading and depth sensor according to claim 3 wherein said circuit means is adapted for time multiplexed protocol communication over said communication link.

5. A combined remote reading heading and depth sensor according to claim 4 wherein said time multiplexed link protocol includes sequential transmission of an address code from said data acquisition unit to said combined sensor, address acknowledgement from said sensor to said acquisition unit, pulse power activation of said photoelectric sensing means by said data acquisition unit, compass heading data transmission by said sensor and depth data transmission by said sensor to the data acquisition unit.

6. A combined remote reading heading and depth sensor according to claim 1 wherein said depth sensor is a piezoelectric transducer which produces an electrical output signal representative of depth.

7. A combined remote reading heading and depth sensor according to claim 1 wherein said inner compass support structure, said rotatable assembly and said depth sensor are disposed within the same damping liquid.

8. A combined remote reading compass heading and depth transducer comprising:
 a housing substantially filled with a damping liquid;
 a heading sensor means operative to generate a first signal responsive to compass heading;
 a depth sensor means operative to generate a second signal responsive to depth;
 means for mounting said heading sensor and depth sensor means within said housing, said mounting means for said heading sensor means comprising an apertured printed circuit board pivotable about a roll axis and adapted for mounting within said housing and a yoke having downwardly extending mounting arms on opposing printed circuit board sides and allowing for pivotable mounting of said heading sensor means about a pitch axis orthogonal to said roll axis within said apertured printed circuit board thereby permitting fully gimbaled mounting of said heading sensor means; and
 means for transmitting a signal representative of said first and second signals to a remote data acquisition unit over a communication link.

9. The transducers of claim 8 further comprising means for mounting said depth sensor means to said printed circuit board.

10. A combined remote reading compass heading and depth transducer comprising:
 a housing substantially filled with a damping liquid;
 a heading sensor means operative to generate a first signal responsive to compass heading;
 a depth sensor means operative to generate a second signal responsive to depth;
 means for mounting said heading sensor and depth sensor means within said housing, said mounting means for said heading sensor means comprising a first support means pivotable about a roll axis of said housing and adapted for mounting within said housing and a second support means mounted to said first support means and pivotably supporting said heading sensor means to allow pivotable rotation of said heading sensor means about a pitch axis orthogonal to said roll axis thereby permitting fully gimbaled mounting of said heading sensor means within said housing; and
 means for transmitting a signal representative of said first and second signals to a remote data acquisition unit over a communication link.

* * * * *